United States Patent [19]

Bauer et al.

[11] Patent Number: 5,530,878
[45] Date of Patent: Jun. 25, 1996

[54] SIMPLIFIED POWER SYSTEM WITH A SINGLE POWER CONVERTER PROVIDING LOW POWER CONSUMPTION AND A SOFT ON/OFF FEATURE

[75] Inventors: Robert M. Bauer, Shirley, Mass.; Wah K. Ng, Nashua, N.H.

[73] Assignee: Sun Microsystems, Inc., Mountain View, Calif.

[21] Appl. No.: 341,438

[22] Filed: Nov. 17, 1994

[51] Int. Cl.$^6$ .................................. G06F 1/32; G06F 1/26
[52] U.S. Cl. .................. 395/750; 364/707; 364/273.1; 364/273.2; 364/273.3; 364/273.5; 364/DIG. 1
[58] Field of Search ............................ 395/750; 364/707; 365/229, 226, 227; 307/66; 377/16

[56] References Cited

U.S. PATENT DOCUMENTS

| 4,045,732 | 8/1977 | Yashiro et al. | 324/133 |
|---|---|---|---|
| 4,309,748 | 1/1982 | Forró et al. | 363/65 |
| 4,674,031 | 6/1987 | Siska, Jr. | 364/184 |
| 4,876,460 | 10/1989 | Johnson | 307/64 |
| 5,182,810 | 1/1993 | Bartling et al. | 395/750 |
| 5,241,680 | 8/1993 | Cole et al. | 395/750 |
| 5,301,334 | 4/1994 | Horiuchi | 395/750 |
| 5,440,748 | 8/1995 | Sekine et al. | 395/750 |

Primary Examiner—Gopal C. Ray
Attorney, Agent, or Firm—Flehr, Hohbach, Test, Albritton & Herbert

[57] ABSTRACT

A computer power system with a keyboard, a computer housing, and a single AC to DC power converter that generates a DC power signal as long as it is energized by an AC power source. The power system is digitally controllable by the central processing unit (CPU) or from soft on/off switches on the keyboard and computer housing. This is made possible by a soft on/off controller that receives soft on/off control signals from the CPU and the soft on/off switches and in response generates a power transition signal that triggers shaping circuits to connect (soft on) or disconnect (soft off) power system output lines and power lines from the converter. The shaping circuits also ensure that the rising edge of a digitally switched power system output signal resembles the rising edge of the converter's cold-start power signal. Following a soft off event,, the power system is in a low power standby state as power is not being supplied to the computer's power hungry components even though the converter is still generating a power signal.

7 Claims, 5 Drawing Sheets

SIMPLIFIED POWER SYSTEM WITH A SINGLE POWER CONVERTER PROVIDING LOW POWER CONSUMPTION AND A SOFT ON/OFF FEATURE

The present invention relates generally to power systems for computers and particularly to a simplified, digitally-controlled computer power system providing low power consumption.

BACKGROUND OF THE INVENTION

Typically, a powered-up computer consumes a great deal of energy to drive its video display and other electronic components such as hard disk drives. Unfortunately, due to the way many computers are used, a significant part of the power they consume is wasted. For example, many computer users leave their machines powered-up twenty-four hours a day to avoid the delay required to boot up the computer from a "cold-start" (when the computer is powered-on from a fully-off state). Also, even during work hours, a computer may idle for hours at a time.

This waste is expensive and it also exacts a toll on the battery life of increasingly-popular laptop computers. Consequently, there is a demand for computer systems that meet the strict power consumption guidelines established by recently adopted industry standards, such as the Energy Star program. Among the wide range of possibilities for reducing computer power consumption there are two principal approaches. First, computers could be built from components based on new, energy efficient technologies; for example, low voltage microprocessors and flat panel LCDs. The chief disadvantage with this approach is expense. Second, in computer systems using mainstream technology, the power used could be dramatically reduced through smarter management of the power system. The following discussion will focus on the second approach.

A typical prior art approach to smarter management of the power used by a computer provides for digital control of the power system. This allows the central processing unit (CPU) to automatically place an idling, fully powered-up computer in a low power standby state, or a user to do the same via remote power control switches. This feature is called "soft off." The prior art also provides a "soft on" feature, which allows the user to restore full operational power from the standby state by activating one of the aforementioned remote power control switches.

Allowing the user to remotely trigger a soft on event (e.g., from a keyboard) requires the power system to supply housekeeping power to at least the remote soft on/off switch(es) and the CPU while the computer is in the standby state. To enable the power system to efficiently supply the housekeeping power in the standby state and the full power required when the computer is in the operational state, the prior art has adopted a two converter arrangement. During normal operation, the main power converter supplies the full power needs of the computer. When the computer system is placed in the standby state, the main converter is switched off and an auxiliary converter switched on to supply a small amount of housekeeping power for the CPU and any other components required for the soft on function. This solution reduces energy consumption, but adds complexity and cost to the power system due to the presence of the two power converters.

A simpler and less expensive solution would ideally utilize a single, always-on power converter to provide both operational and housekeeping power. In such a system, the prior art soft off and soft on features would be provided by respectively switching off and on the power converter's outputs to all but those components nonessential to housekeeping functions. However, using a single converter in this fashion creates a power supply problem not present in energy efficient, two converter power systems.

In a typical AC powered computer system, a mechanical power control switch energizes the inputs of an on-board AC to DC power converter, resulting in the converter's DC output rising gradually from off to fully-on. This gradual cold start turn-on, which is optimal for electronic computer components, is also present in energy efficient two converter systems following a soft on event due to the main converter's being switched on to restore full operational power.

However, in a one converter system where the single converter is always left on, merely switching the always-on converter's outputs results in a rising edge to the DC power signal that approximates a step function. Supplying such a stepped power signal to the large integrated circuits (ICs) that comprise a computer system could result in IC latchup problems.

For the foregoing reasons, there is a need for an efficient, digitally controlled power system having one always-on converter that supplies the computer's electronic components with a DC output signal whose rising edge following a soft on event resembles the gradual rising edge of the DC power signal of the converter following a cold start.

SUMMARY OF THE INVENTION

In summary, the present invention is a power system meeting these needs. A simplified, power efficient power system having features of the present invention comprises a keyboard with a user controllable soft power switch, a computer housing having another user controllable soft power switch, and a single AC to DC power converter that generates a DC power signal as long as the converter is energized by an AC power source.

In response to operation of either of the user controlled soft power switches, a soft on/off controller generates a power transition signal that triggers shaping circuitry to initiate a transition of the power system between a standby state and an operational state. To take the system from the standby state to the operational state (a "soft on" event), the shaping circuitry connects the power system's outputs to the converter's power signal and shapes the leading edge of the resulting output signal to mimic the gentle ramp of the converter's power signal that is seen following a system cold start. Shaping the leading edge of the output signal in this manner prevents latchup problems that could result from simply switching on the power system's outputs to the computer's circuits and makes possible the simplified, one converter design of the present invention.

To take the system from the operational state to the standby state (a "soft off" event), the shaping circuitry disconnects the power system's outputs from the converter's always-on power signal, which cuts off power to a majority of the computer's components and reduces power consumption. The soft on/off controller is also responsive to the CPU, which, if it determines that the computer system is idling and wasting power, can request a soft off event. To allow a user to initiate a soft off event when the CPU or keyboard are locked up and unresponsive, the soft on/off controller prioritizes power control commands from the CPU, keyboard switch and housing switch so that the latter can always initiate a soft on or off event regardless of the state of the other two.

The present invention also comprises a method of generating a first soft on/off signal from a switch on the keyboard and a second soft on/off signal from a switch on the computer housing, and outputting from an AC to DC power converter a DC power signal as long as the converter is energized by an alternating current power source. This DC power signal has a gradually rising edge upon a cold power start of the computer. The method further includes outputting a power transition signal from a soft on/off controller in response to the first and second soft on/off signals, where the power transition signal triggers a transition of the power system between a standby state and an operational state. Finally, the method includes generating, in response to the power transition signal triggering a transition from the standby state to the operational state, an output signal having a leading edge, and shaping the leading edge of the output signal to resemble the DC power signal's gradually rising edge upon a cold power start of the computer.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
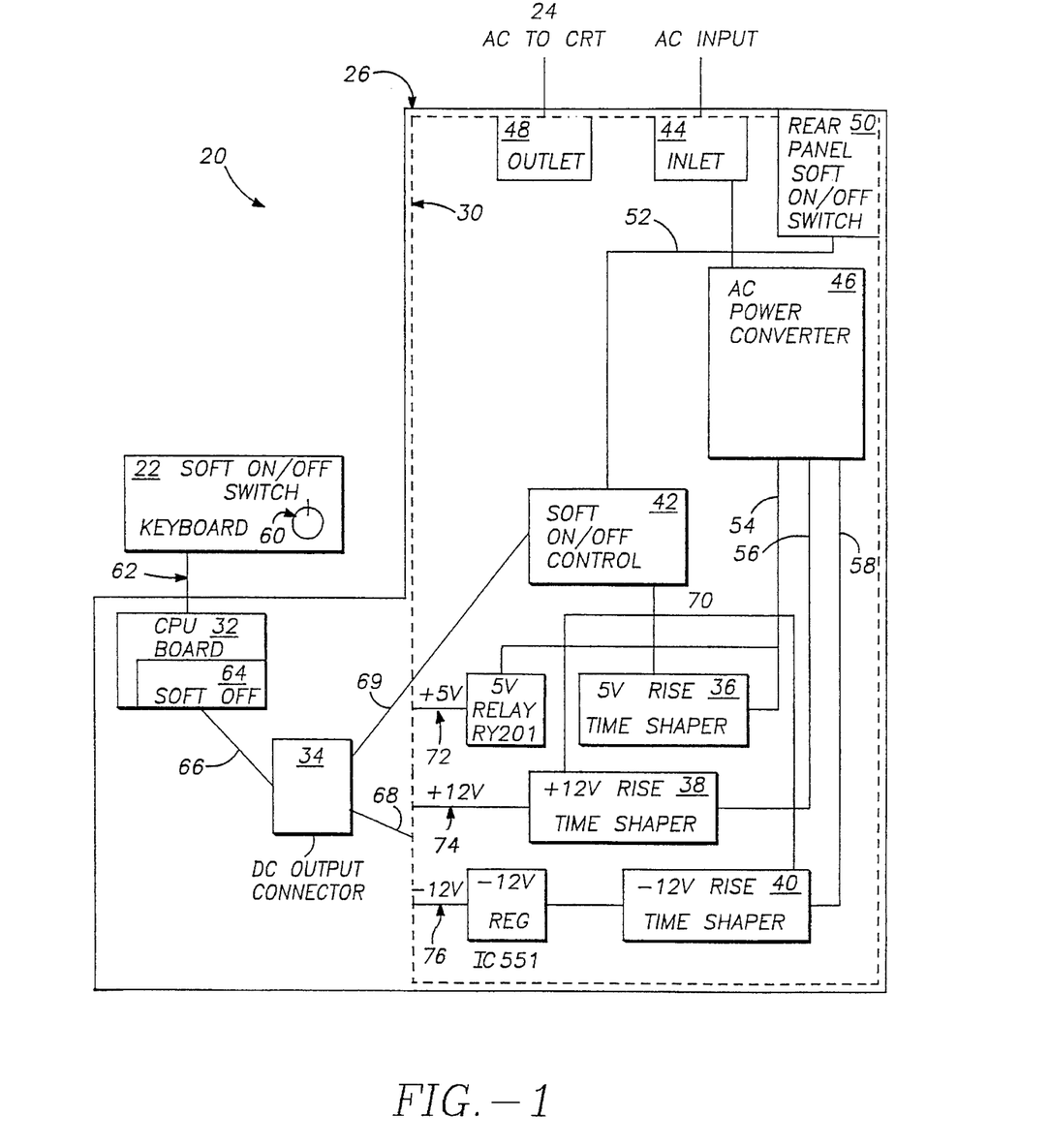
FIG. 1 is a simplified block diagram of a preferred embodiment of the present invention.

Referring to FIG. 1, there is shown a block diagram for a computer power system 20, including a keyboard 22 and a computer housing 26 (defined by a solid line) that includes a power supply 30 (defined by a dashed line), a CPU board 32, and a DC output connector 34.

Novel aspects of the power system 20 are embodied in a +5 volt rise time shaper 36, a +12 volt rise time shaper 38, a −12 volt rise time shaper 40, and a soft on/off controller 42. A detailed description of these elements will be provided below and especially in relation to FIGS. 3, 4 and 5. The standard features of the power supply include an inlet 44 for an AC input, an AC to DC power converter 46, an outlet 48 to supply AC power to a video display, a rear panel soft on/off switch 50 accessible from the computer housing 26, a relay RY201, and a voltage regulator IC551. These standard features are briefly described below.

The inlet 44 connects the AC to DC power converter 46 to an AC input carrying an AC power signal from which the converter 46 generates DC power signals of +5, +12 and −12 volts. Additional processing on the +5 volt DC power signal is performed by the +5 volt rise time shaping circuit 36, which is electrically coupled to the power converter 46 via the +5 volt DC power line 54. A similar relationship exists between the power converter 46 and the +12 and −12 volt DC power signals, +12 and −12 volt rise time shaping circuitry 38 and 40, and +12 and −12 volt DC power lines 56 and 58. It is a feature of the present invention that, as long as the AC input is connected to an AC power supply (e.g., plugged into a wall outlet), the AC to DC power converter 46 will continually generate the DC power signals.

The keyboard 22 includes a keyboard soft on/off switch 60 and is coupled to the CPU board 32 via a keyboard connector 62. The keyboard soft on/off switch 60 is controlled by a computer user and, when activated, generates a keyboard soft on/off signal that is applied to the CPU board 32 via the keyboard connector 62 and indicates that the user wishes to toggle the power system between its low power standby state and full power operational state. The DC power required by the keyboard 22 is supplied via the keyboard connector 62.

The CPU board 32, which is within the computer housing 26, includes a CPU soft off feature 64 that can automatically initiate a soft off event. The CPU soft off feature 64 is implemented in software as a pad of the computer's operating system and, along with the rest of the operating system, is loaded from a hard disk drive into program memory on the CPU board 32 when the computer is booted up. This feature monitors such factors as cursor movement and CPU and keyboard activity to determine whether the computer is idling and wasting power. Upon determining that the computer is idle, the CPU soft off feature 64 initiates a soft off event by generating a CPU soft off signal that is applied to the DC output connector 34 via a CPU power connector 66. Additionally, the CPU board 32 relays the keyboard soft on/off signal generated by the keyboard soft on/off switch 60 to the DC output connector 34 via the CPU power connector 66.

The DC output connector 34 is located externally to the power system but within the computer housing 26 and is coupled to the power system 30 via the DC power cable 68. The DC output connector 34 supplies DC power to computer components located outside the power system, such as the CPU board 32, which takes its DC power supply from the DC power connector via the CPU power connector 66. The DC output connector 34 also relays the keyboard soft on/off signal and the CPU soft off signal to the soft on/off controller 42 via the soft on/off line 69.

An additional means for triggering soft on/off events is provided by the rear panel soft on/off switch 50, which is located on the computer housing 26. The rear panel soft on/off switch 50 is controlled by a computer user and, when activated, outputs a priority on/off signal to the soft on/off controller 42 via the priority on/off line 52.

The soft on/off controller 42 controls the initiation of soft on/off events based on the status of the keyboard soft on/off signal, the CPU soft off signal, and the priority on/off signal. When one or a combination of the preceding signals indicates that the CPU or a user is requesting a soft on or off event, the soft on/off controller 42 drives the on/off line 70 from low to high (soft on) or high to low (soft off). This power transition signal triggers the +5 volt rise time shaper 36, the +12 volt rise time shaper 38, and the −12 volt rise time shaper 40 to simultaneously generate the appropriate soft on/off output signal on the +5 volt, −12 volt and +12 volt output lines. After initiating a soft off/on event, for as long as the computer system remains in the standby/operational state, the on/off line 70 stays low/high.

The +5 volt rise time shaper 36 responds to the power transition signal provided by the soft on/off controller 42 by connecting (soft on) or disconnecting (soft off) the power system's +5 volt output line 72 from the always-active +5 volt power line 54. In the case of a soft on event, the +5 volt rise time shaper 36 also shapes the leading edge of the signal on the +5 volt output line to resemble the gradual rise of the +5 volt DC power signal following a cold start of the power system. The +12 volt rise time shaper 38 and the −12 volt rise time shaper 40 perform the same soft on/off functions in relation to the +12 and −12 volt DC power and output signals. The leading edge shapes of the +5, +12 and −12 volt soft on waveforms are discussed in greater detail with reference to FIG. 2.

Thus, when the computer system is in the standby state (following a soft off event initiated by a user or the CPU), it draws little power because the power system outputs are disconnected from the power converter and, as a result, are not driving power hungry computer components. The converter 46 need then continue to supply only the small amount of power required for housekeeping purposes, which, in the present embodiment, is approximately 2 watts. When the user desires to bring the system back to the operational state, the shapers connect the power system outputs with the converter's power signal after shaping the rising edge of the power system outputs to be analogous to the system's cold start behavior. In the present power system, operational power is whatever the computer system demands.

In a preferred embodiment, the soft on/off signals from the CPU, keyboard and rear panel are prioritized such that the soft on/off controller 42 overrides a pending soft on/off event initiated from the rear panel soft on/off switch 50 only in response to a subsequent operation of the same. Conversely, the rear panel soft on/off switch 50 can override any soft on/off event initiated by the CPU soft off feature 64 or the keyboard soft on/off switch 60. This feature, called "priority on/off," allows the user to digitally control the power supply from the rear panel switch 50 on the computer housing 26 even though the keyboard 22 and/or the CPU board 32 are locked up. In particular, when the power system is in its operational state, activation of the rear panel soft on/off switch 50 will cause the soft on/off control 42 to transition the power system to its standby state regardless of the status of the keyboard switch 60. This allows a user to turn the system off and then back on when the computer is locked up and unresponsive to keyboard input.

The Power System Output Signals

Figure 2:
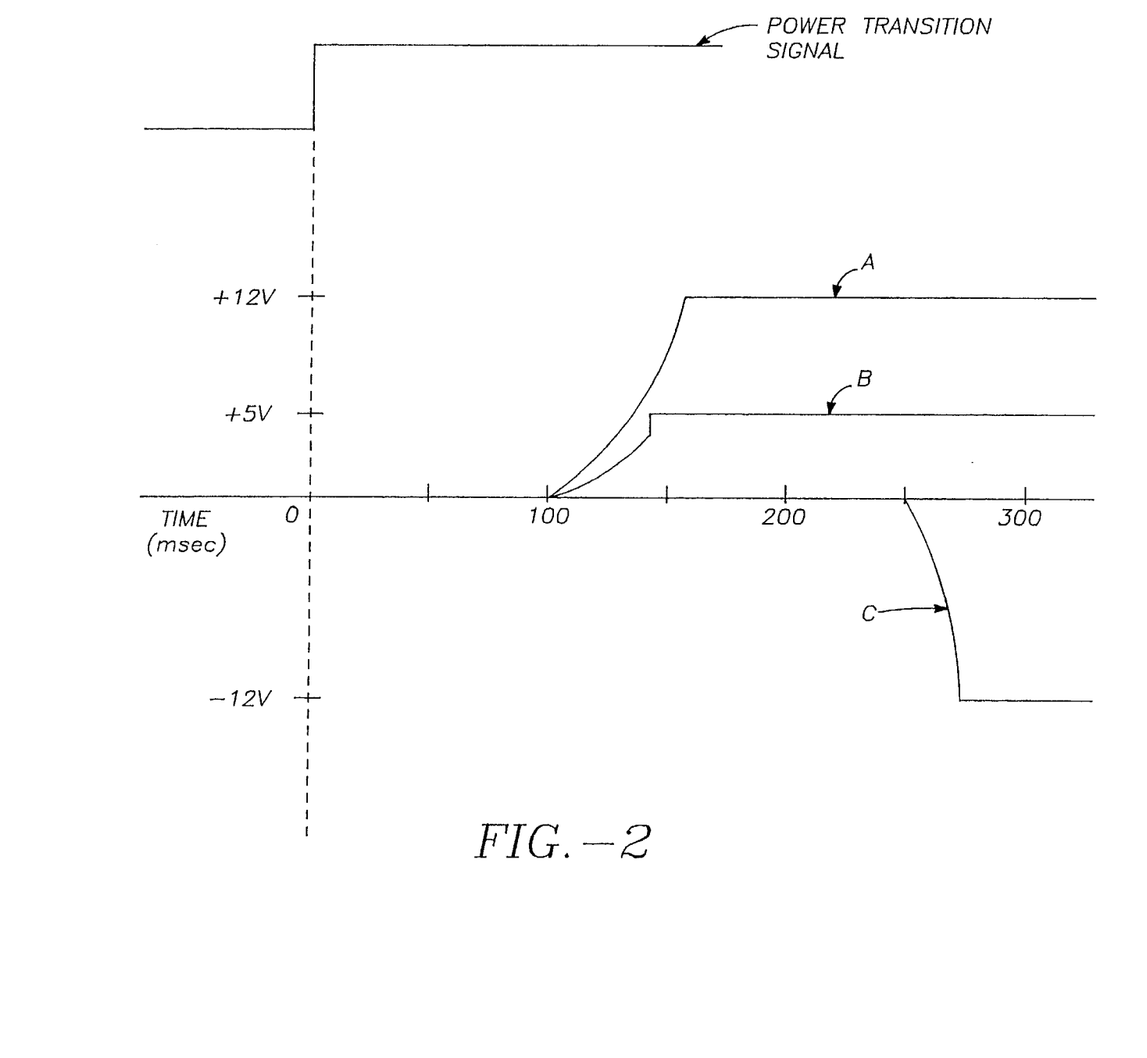
FIG. 2 is a plot of the +5 volt, +12 volt and −12 volt output signals that are provided by the preferred embodiment of the present invention.

Referring to FIG. 2, there is shown a plot of three power curves showing the gently ramped leading edge of the power system output signals following a soft on event. In the case of the +5 and +12 volt output signals, the leading edge corresponds to a rising voltage signal. For the −12 volt signal, the leading edge corresponds to a falling voltage signal.

Plot A, from time=0 to the end of the trace, corresponds to the +12 volt output signal generated on the +12 volt output line 74 by the +12 volt rise time shaper 38 following a soft on event. This signal is applied to the computer's hard disk drive, RS232 port, and audio power amp. Plot B, from time=0 to the end of the trace, represents the +5 volt output signal on the +5 volt output line 72, which is generated through the combined action of the +5 volt relay RY201 shown in FIG. 1 and the +5 volt rise time shaper 36 following a soft on event. This signal drives the discrete and integrated electronic circuits comprising the computer system. Plot C, from time=0 to the end of the trace, corresponds to the −12 volt signal output to the −12 volt output line 76 by the combined action of the −12 volt regulator IC551 shown in FIG. 1 and the −12 volt rise time shaper 40 following a soft on event. This signal is applied to the computer's RS232 port.

The +5 Volt Rise Time Shaper

Figure 3:
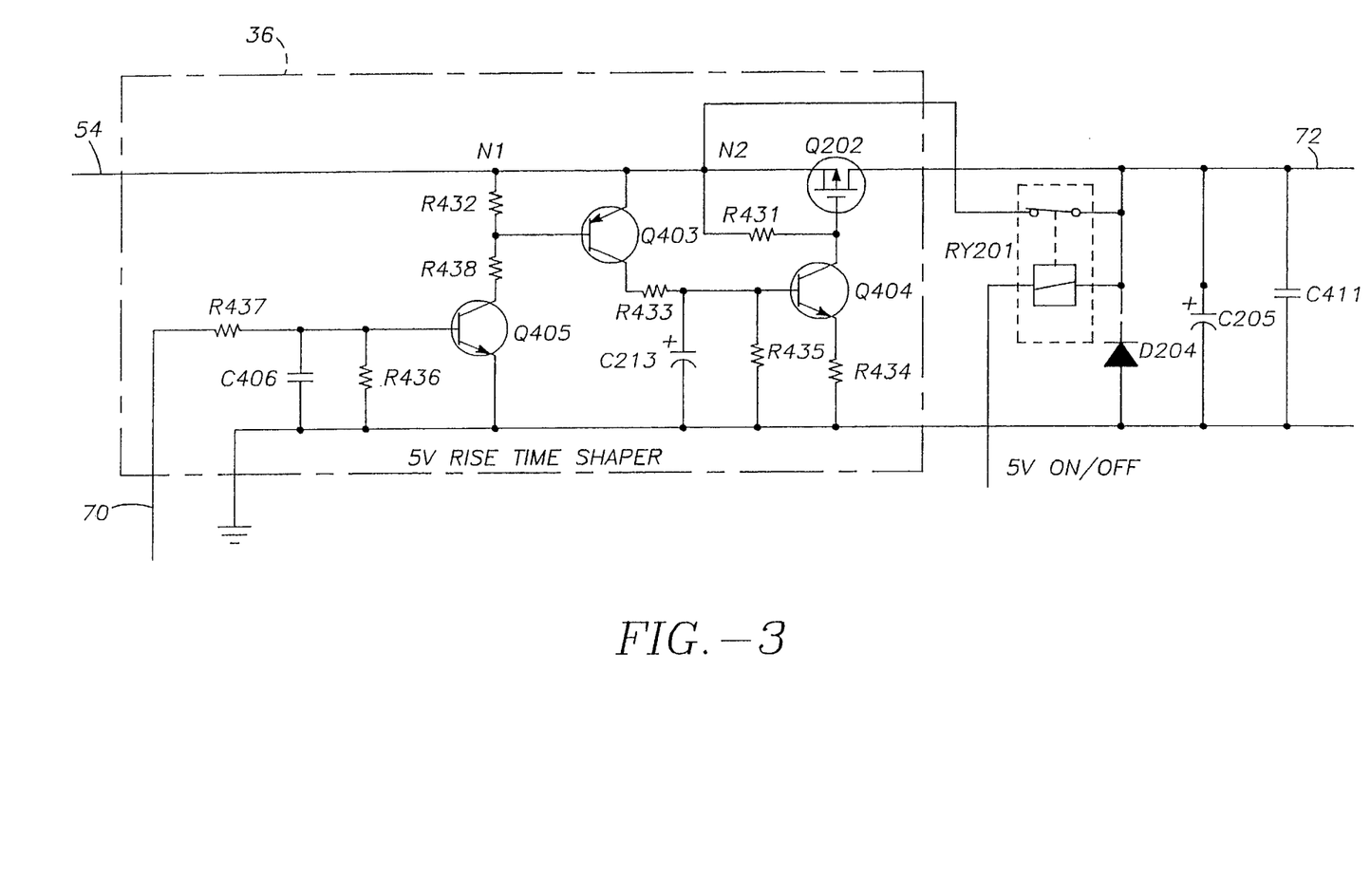
FIG. 3 is a schematic of the +5 volt rise time shaping circuit of the preferred embodiment of the present invention.

FIG. 3 shows the schematic diagram of the +5 volt rise time shaper circuit 40 from FIG. 1. This block generates the +5 volt output signal shown in FIG. 2 from two primary inputs. The +5 volt DC power line 54 from the AC to DC power converter 46 provides power to the +5 volt rise time shaper circuit, and is connected electrically to node N1, the emitter of the pnp transistor Q403, the source of the p-channel FET Q202, node N2, and the switched input of the relay RY201. A power transition signal from the soft on/off controller 42 is applied to the resistor R437 via the on/off line 70.

The soft on/off controller 42 initiates a soft on event by driving the power transition signal from low to high voltage. When this voltage is applied through R437 to the base of Q405, Q405 becomes forward biased. Forward biasing Q405 causes a collector current to flow in Q405, creating a voltage drop across R432 and R438, which pulls down the base of Q403. This in turn forward biases the pnp transistor Q403, and Q403's resulting collector current charges C213 through R433, resulting in a ramped voltage input to the base of Q404. That ramp is amplified as Q404 goes through its active region, which in turn causes the p-channel FET Q202, the gate of which is tied to the collector of Q404, also to go through its active region. The resulting ramped +5 volt output signal on the drain of Q202 is reflected on the +5 volt output line 72, to which the drain of Q202 is tied.

The +5 volt output line 72 is also tied to the switched output of the relay RY201. The switched input of RY201 is tied to the +5 volt DC power line 54 at node N2. The relay coil is energized when the 5 V ON/OFF line of relay RY201 is driven from low to high. This transition is timed such that, while the aforementioned ramp on the +5 volt output signal is being generated by the +5 volt rise time shaper 36, the relay on/off signal is low. After some predetermined time calculated to allow the +5 volt output signal to rise to approximately 4 volts, the timer toggles the signal on the 5 V ON/OFF line of relay RY201 from low to high, which has the effect of energizing the relay RY201 and clamping the +5 volt output line 72 to the +5 volt DC power line 54. As a result of the combined functions of the relay RY201 and the +5 volt rise time shaper 36, the rising +5 volt output signal defines a gradual ramp from 0 volts to approximately 4 volts followed by a step to +5 volts as is shown in trace B of FIG. 2.

The capacitors C205, C411 and diode D204 perform additional signal conditioning on the +5 volt output signal and are connected between the +5 volt output line 72 and ground. C205 eliminates contact bounce due to the closing of the relay RY201. C411 is a high frequency RF capacitor that eliminates EMI (electromagnetic interference) caused by the closing of RY201. D204 is a back EMF clamp diode to prevent back EMF flow also due to the operation of RY201.

The −12 Volt Rise Time Shaper

Figure 4:
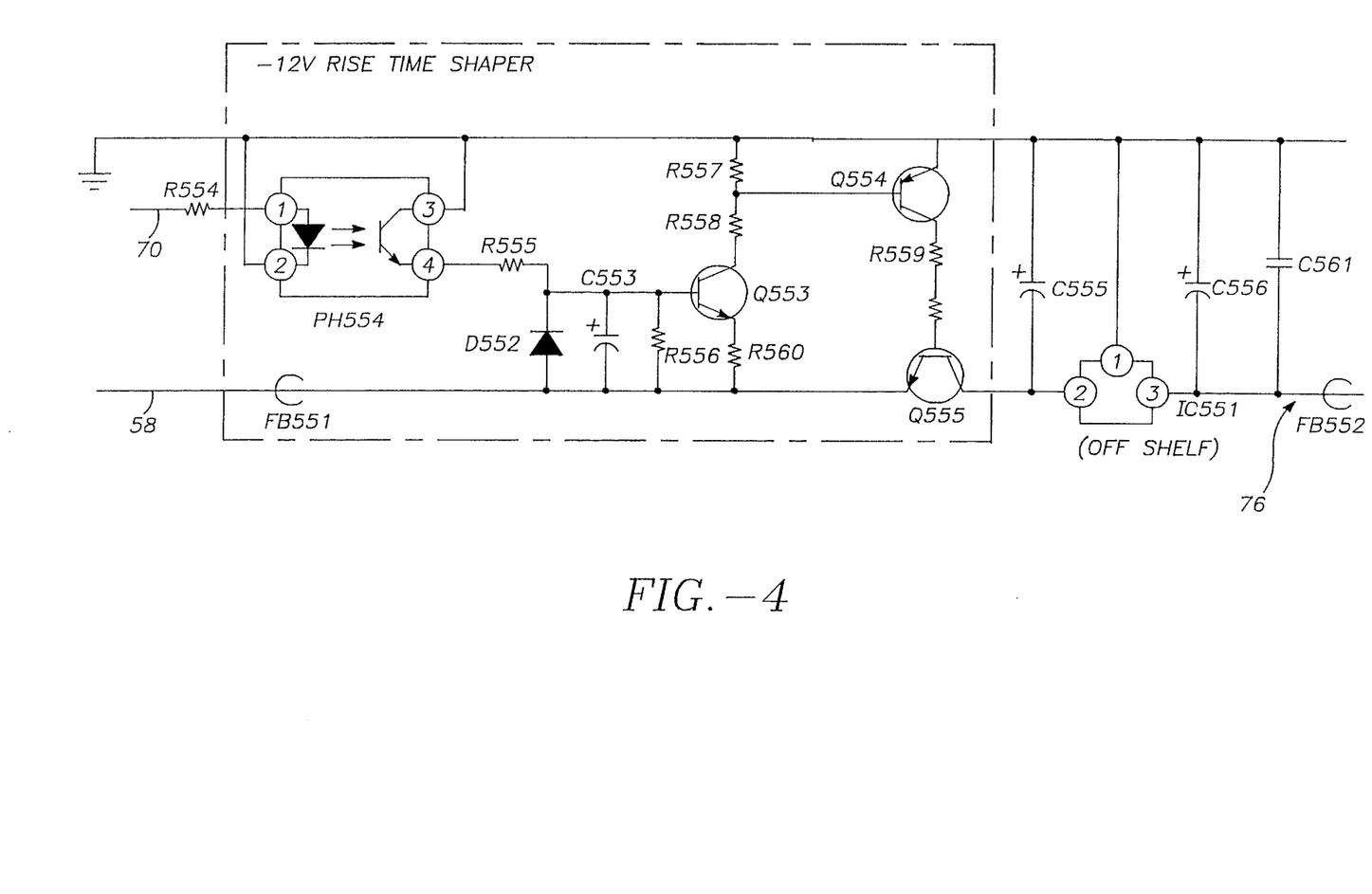
FIG. 4 is a schematic of the −12 volt rise time shaping circuit of the preferred embodiment of the present invention.

FIG. 4 shows the circuit diagram corresponding to the 12 volt rise time shaper block 70 shown in FIG. 1. There are two principal inputs to the −12 volt rise time shaper 40. The on/off line 70 from the soft on/off controller 42 functions as discussed above with reference to FIG. 3. The −12 volt power signal on line 58 from the power converter 46 is the other input to this block.

The soft on/off controller 42 initiates a soft on event by driving the power transition signal on line 70 from low to high voltage. When this signal is applied to R554 via the on/off line 70, the diode within the optocoupled diode-transistor pair PH554 is forward biased and emits light. The emitted light forward biases the optocoupled transistor within PH554, which results in a current through the resistor R555 that pulls up the diode D552 and charges the capacitor C553. This creates an upward ramped signal into the base of the npn transistor Q553 and that upward ramped signal generates a collector current through Q553's collector and resistor R558 that, in turn, draws current from the base of pnp transistor Q554 so as turn on Q554. The resulting collector current through Q554 forward biases npn transistor Q555, which results in a turn on ramp at the output of Q555's collector. The ramped output signal of Q555 is input to the −12 volt, three terminal regulator IC551 (an industry-standard 7912), the output of which generates a −12 volt output signal on the −12 volt output line 76. Without the −12 volt regulator IC551, the −12 volt output signal would fall to −14 volts, which is the actual voltage supply level of the −12 volt DC power signal on line 58.

Additional conditioning on the −12 volt output signal is provided by the capacitors C555, C556 and C561, which are connected between the −12 volt output line 76 and ground, and the ferrite beads FB551 and FB552 which are tied to the −12 volt output line 76. C555 and C556 are storage capacitors that help to stabilize the regulator IC551. C561, and FB551 and FB552 provide RF filtering on the −12 volt output signal to eliminate noise and EMI.

The +12 Volt Rise Time Shaper

Figure 5:
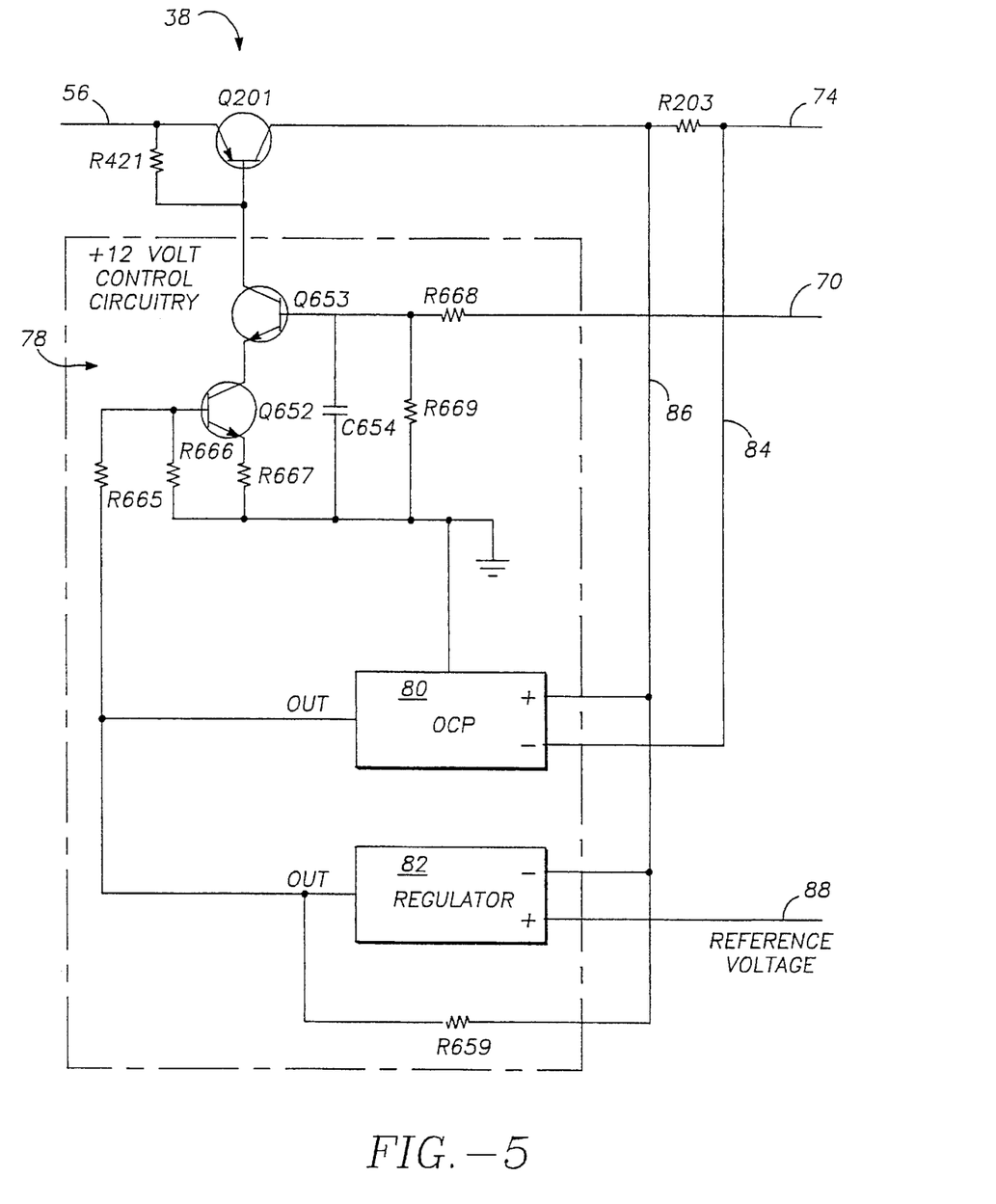
FIG. 5 is a schematic of the +12 volt rise time shaping circuit of the preferred embodiment of the present invention.

FIG. 5 shows the circuit diagram corresponding to the +12 volt rise time shaper 38 shown in FIG. 1. This block generates the +12 volt output signal shown in FIG. 2 in response to two primary inputs. The +12 volt DC power signal on line 56 from the AC to DC converter 46 serves as the unregulated power input to the +12 volt rise time shaper 38 and is applied to one end of R421 and the emitter of the pnp pass transistor Q201. The power transition signal from the soft on/off controller 42 is input to the base of the pnp transistor Q653 over the on/off line 70.

When the base of Q653 is pulled high by the power transition signal (initiating a soft on event), the +12 volt control circuit 78 and the +12 volt output signal on line 74 are enabled. When the base of Q653 is pulled low by the power transition signal (initiating a soft off event), the +12 volt control circuit 78 and the +12 volt output signal 26 are disabled. The rise time of Q653 is programmed by capacitor C654, which is connected between ground and the base of Q653. As Q653 turns on, the ramped current flow through R421 results in a voltage drop across R421 that is also ramped. This forward biases Q201, which outputs a ramped signal that is coupled to the +12 volt output line 74 via a sense resistor R203. The rising ramp of this signal is shown on trace B of FIG. 2.

The +12 volt control circuitry 78 regulates the +12 volt output signal and also provides over current protection (OCP). These functions are implemented in the OCP block 82 and the Regulator block 80 respectively. No greater detail is shown for these blocks as the implementation of these functions is well known in the prior art.

The OCP block 80 senses the current flowing in R203 by amplifying the difference between voltages on the regulator sense line 86 and the OCP sense line 84, which are connected to the +12 volt output line 74 on either side of R203.

When the amplified voltage drop across R203 is too high, indicating an "over current" condition, the OCP block 80 reduces the forward bias of Q652, which has the effect of opening Q652 and cutting off current through R421. As a result, the forward bias of Q201 is eliminated, which stops any current flowing in Q201 to the +12 volt DC output line as long as the over current situation persists.

The Regulator block 82 functions independently of the OCP block 80 but relies on a similar method to regulate the +12 volt output signal. The Regulator block 82 compares the voltage on the regulator sense line 86 and a zener voltage reference signal on reference line 88. If the voltage level of the +12 volt output signal is too high, the Regulator block 82 reduces the current flowing to the base of Q652 via R665, which reduces Q652's forward bias. Reducing Q201's forward bias reduces the current flowing through R421, which reduces the forward bias of Q201. As a result, the voltage on the +12 volt output line 74 drops until an equilibrium is reached at which the bias of transistor Q652 controls the current flow through transistor Q201 so as to maintain a voltage of +12 volts on node 86.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in a first alternate embodiment, the soft on/off control 42 is responsive only to keyboard initiated soft on signals, while switch 50 is used as a hard on/off switch such that the AC power converter 46 generates +5, +12 and −12 volt DC signals on lines 54, 56 and 58, respectively, only when switch 50 is in the ON position. This alternate embodiment allows the user to shut off all power to the computer without having to unplug the computer from its AC power source, but still allows for a soft turn on using the keyboard. In a second alternate embodiment, a hard on/off switch is provided on the rear or front panel in addition to the soft on/off switch 50, where the hard on/off switch turns off the AC power converter 46 even though the computer remains connected to an AC power source.

What is claimed is:

1. A power system for a computer, the system comprising:

a keyboard with a first selectable digital control switch;

a computer housing with a second selectable digital control switch;

an AC to DC power converter that generates a DC power signal as long as said converter is energized by an alternating current power source, said DC power signal having a gradual rising edge upon a cold power start of said computer, said power converter alone supplying said computer with power when said power system is in a state selected from a standby state or an operational state;

a soft on/off controller for generating a power transition signal in response to operation of at least one of said first and second digital control switches, said power transition signal triggering a transition of said power system between said standby state and said operational state; and shaping circuitry, coupled to said AC to DC power converter and said soft on/off controller, responsive to said power transition signal and said DC power signal to generate upon transition from said standby state to said operational state an output signal having a leading edge, wherein Said leading edge of said output signal is shaped to resemble said DC power signal's rising edge upon a cold power start of said computer, said output signal and not said DC power signal being used to power components of said computer.

2. The power system from claim 1 wherein said on/off controller is responsive to a CPU soft off signal generated by a central processing unit (CPU) that is part of said computer.

3. The power system from claim 1 wherein power consumption by said computer following completion of a soft off event is substantially less than power consumption by said computer following completion of a soft on event.

4. A power system for a computer, the system comprising:

at least one selectable digital control switch;

an AC to DC power converter that generates a DC power signal as long as said converter is energized by an alternating current power source, said DC power signal having a gradual rising edge upon a cold power start of said computer, said power converter alone supplying said computer with power when said power system is in a state selected from a standby state or an operational state;

a soft on/off controller for generating a power transition signal in response to operation of said at least one digital control switch, said power transition signal triggering a transition of said power system between said standby state and said operational state; and shaping circuitry, coupled to said AC to DC power converter and said soft on/off controller, responsive to said power transition signal and said DC power signal to generate upon transition from said standby state to said operational state an output signal having a leading edge, wherein said leading edge of said output signal is shaped by said shaping circuitry to resemble said DC power signal's rising edge upon a cold power start of said computer, said output signal and not said DC power signal being used to power components of said computer.

5. A method for digitally controlling a power system for a computer, said method comprising the steps of:

generating at least one soft on/off signal by operating at least one of a first selectable digital control switch on a keyboard and a second selectable digital control switch on a computer housing;

outputting from an AC to DC power converter a DC power signal as long as said power converter is energized by an alternating current power source, said DC power signal having a gradual rising edge upon a cold power start of said computer, said power converter alone supplying said computer with power when said power system is in a state selected from a standby state or an operational state;

outputting a power transition signal from a soft on/off controller in response to said at least one soft on/off signal, said power transition signal triggering a transition of said power system between said standby state and said operational state; and generating from said DC power signal and in response to said power transition signal triggering a transition from said standby state to said operational state an output signal having a leading edge, and shaping said leading edge of said output signal to resemble said DC power signal's rising edge upon a cold power start of said computer, said output signal and not said DC power signal being used to power components of said computer.

6. A power system for a computer, the system comprising:

a keyboard with a first selectable digital control switch;

a computer housing with a second selectable digital control switch;

an AC to DC power converter that generates a DC power signal as long as said converter is energized by an alternating current power source, said DC power signal having a gradual rising edge upon a cold power start of said computer, said power converter alone supplying said computer with power when said power system is in a state selected from a standby state or an operational state;

a soft on/off controller for generating a power transition signal in response to operation of at least one of said first and second digital control switches, said power transition signal triggering a transition of said power system between said standby state and said operational state; and shaping circuitry, coupled to said AC to DC power converter and said soft on/off controller, responsive to said power transition signal and said DC power signal to generate upon transition from said standby state to said operational state an output signal having a leading edge, wherein said leading edge of said output signal is shaped to resemble said DC power signal's rising edge upon a cold power start of said computer, said output signal and not said DC power signal being used to power components of said computer;

wherein said soft on/off controller accords higher priority to said operation of said second selectable digital control switch than to said operation of said first selectable digital control switch, such that when the power system is in its operational state, activation of said second selectable control switch causes said soft on/off controller to transition the power system to its standby state regardless of status of said first selectable digital control switch.

7. A method for digitally controlling a power system for a computer, said method comprising the steps of:

generating at least one soft on/off signal from at least one selectable digital control switch;

outputting from an AC to DC power converter a DC power signal as long as said power converter is energized by an alternating current power source, said DC power signal having a gradual rising edge upon a cold power start of said computer, said power converter alone supplying said computer with power when said power system is in a state selected from a standby state or an operational state;

outputting a power transition signal from a soft on/off controller in response to said at least one soft on/off signal, said power transition signal triggering a transition of said power system between said standby state and said operational state; and generating from said DC power signal, in response to said power transition signal triggering a transition from said standby state to said operational state, an output signal having a leading edge and shaping said leading edge of said output signal to resemble said DC power signal's rising edge upon a cold power start of said computer, said output signal and not said DC power signal being used to power components of said computer.

* * * * *